United States Patent
Yang (10) Patent No.: US 10,425,821 B2
(45) Date of Patent: Sep. 24, 2019

(54) MOBILE DATA STORAGE DEVICE WITH ACCESS CONTROL FUNCTIONALITY

(71) Applicant: Chien-Kang Yang, Taipei (TW)

(72) Inventor: Chien-Kang Yang, Taipei (TW)

( * ) Notice: Subject to any disclaimer, the term of this patent is extended or adjusted under 35 U.S.C. 154(b) by 189 days.

(21) Appl. No.: 15/645,364

(22) Filed: Jul. 10, 2017

(65) Prior Publication Data

US 2018/0213401 A1     Jul. 26, 2018

(30) Foreign Application Priority Data

Jan. 25, 2017 (TW) .............................. 106102830 A
Jan. 25, 2017 (TW) .............................. 106201379 U (51) Int. Cl.

| | | |
|---|---|---|
| *H04W 12/08* | (2009.01) | |
| *G06F 12/14* | (2006.01) | |
| *H04L 9/08* | (2006.01) | |
| *H04L 9/32* | (2006.01) | |
| *H04W 12/04* | (2009.01) | |

(Continued)

(52) U.S. Cl.
CPC ........ *H04W 12/08* (2013.01); *G06F 12/1408* (2013.01); *G06F 12/1466* (2013.01); *G06F 21/72* (2013.01); *G06F 21/79* (2013.01); *G06Q 20/32* (2013.01); *G06Q 20/3226* (2013.01); *H04L 9/0838* (2013.01); *H04L 9/3242* (2013.01); *H04L 9/3247* (2013.01);
(Continued)

(58) Field of Classification Search
CPC ... H04W 12/08; H04W 12/04; G06F 12/1408; G06F 12/1466; G06F 21/79; G06Q 20/32; G06Q 20/3226; H04L 9/0838; H04L 9/3242; H04L 9/3247

USPC ......................................................... 713/171
See application file for complete search history.

(56) References Cited

U.S. PATENT DOCUMENTS 8,856,918 B1 * 10/2014 Efstathopoulos ....... G06F 21/31
                                                  713/184
2006/0004974 A1 * 1/2006 Lin ..................... G06F 21/6245
                                                  711/164

(Continued)

FOREIGN PATENT DOCUMENTS

| CN | 201323065 Y | 10/2009 |
|---|---|---|
| JP | 2008539482 A | 11/2008 |

(Continued)

OTHER PUBLICATIONS

The Office Action issued to Japanese counterpart application No. 2017-214369 by the Japan Patent Office dated Dec. 18, 2018.
(Continued)

*Primary Examiner* — Michael S McNally
(74) *Attorney, Agent, or Firm* — MLO, a professional corp.

(57) ABSTRACT

A mobile data storage device connectable to an electronic device includes a communication interface unit, a storage module and a control module connected to aforementioned components. The control module allows establishment of a data connection to the electronic device after it is determined that credential information obtained from the electronic device is authenticated, receives an asserted user ID and an asserted user password from the electronic device, looks up a user authority in a permissions table based on the asserted user ID, and enables the electronic device to operate the storage module based on the user authority, the asserted user ID, the asserted user password and a ID-password table.

11 Claims, 6 Drawing Sheets

(51) Int. Cl.
*G06F 21/72* (2013.01)
*G06F 21/79* (2013.01)
*G06Q 20/32* (2012.01)

(52) U.S. Cl.
CPC ..... *H04W 12/04* (2013.01); *G06F 2212/1052* (2013.01); *G06F 2221/2141* (2013.01)

(56) References Cited

U.S. PATENT DOCUMENTS

| | | | |
|---|---|---|---|
| 2009/0006796 A1* | 1/2009 | Chang | G06F 21/79 711/163 |
| 2011/0055589 A1 | 3/2011 | Hsieh | |
| 2014/0289121 A1* | 9/2014 | Yang | G06Q 20/353 705/44 |
| 2015/0181433 A1 | 6/2015 | Li et al. | |

FOREIGN PATENT DOCUMENTS

| | | | |
|---|---|---|---|
| JP | 2009503695 | A | 1/2009 |
| JP | 2010211359 | A | 9/2010 |
| TW | 200928739 | A | 7/2009 |
| TW | 201415278 | A | 4/2014 |
| TW | 201510893 | A | 3/2015 |

OTHER PUBLICATIONS

The Search Report issued to European counterpart application No. 17189761.4 by the EPO dated Nov. 2, 2017.
Search Report appended to an Office Action issued to Taiwanese counterpart application No. 106102830 by the TIPO dated Nov. 17, 2017.

* cited by examiner

MOBILE DATA STORAGE DEVICE WITH ACCESS CONTROL FUNCTIONALITY

CROSS-REFERENCE TO RELATED APPLICATION

This application claims priorities of Taiwanese Patent Application Nos. 106102830 and 106201379, both filed on Jan. 25, 2017.

FIELD

The disclosure relates to a mobile data storage device, and more particularly to a mobile data storage device with access control functionality.

BACKGROUND

Mobile data storage devices (e.g., a USB flash drive) are widely used to transport data. The data stored in a conventional mobile data storage device is accessible by an electronic device (e.g., a personal computer) when the conventional mobile data storage device is connected thereto. However, the conventional mobile data storage device usually lacks access control functionality to secure the data stored therein, which may be prone to theft or tampering.

SUMMARY

Therefore, an object of the disclosure is to provide a mobile data storage device with access control functionality that can alleviate at least one of the drawbacks of the prior art.

According to the disclosure, the mobile data storage device is to be electrically connected to an electronic device. The mobile data storage device includes a communication interface unit, a storage module and a control module. The control module is electrically connected to the communication interface unit and the storage module. The control module stores a permissions table and an ID-password table. The permissions table is configured to record a reference user identification (ID), and a user authority that corresponds to the reference user ID and that specifies what operation is allowed on the storage module. The ID-password table is configured to record the reference user ID and a reference user password that corresponds to the reference user ID. The control module is configured to obtain credential information via the communication interface unit from the electronic device, and to, after the control module verifies that the credential information is authentic, allow the electronic device to establish a data connection with the communication interface unit. The control module is further configured to receive an asserted user ID and an asserted user password that are transmitted by the electronic device, to look up the user authority in the permissions table based on the asserted user ID, and to enable, when it is determined by the control module that the asserted user ID and the asserted user password conform respectively to the reference user ID and the reference user password in the ID-password table, the electronic device to perform the operation allowed on the storage module based on the user authority.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
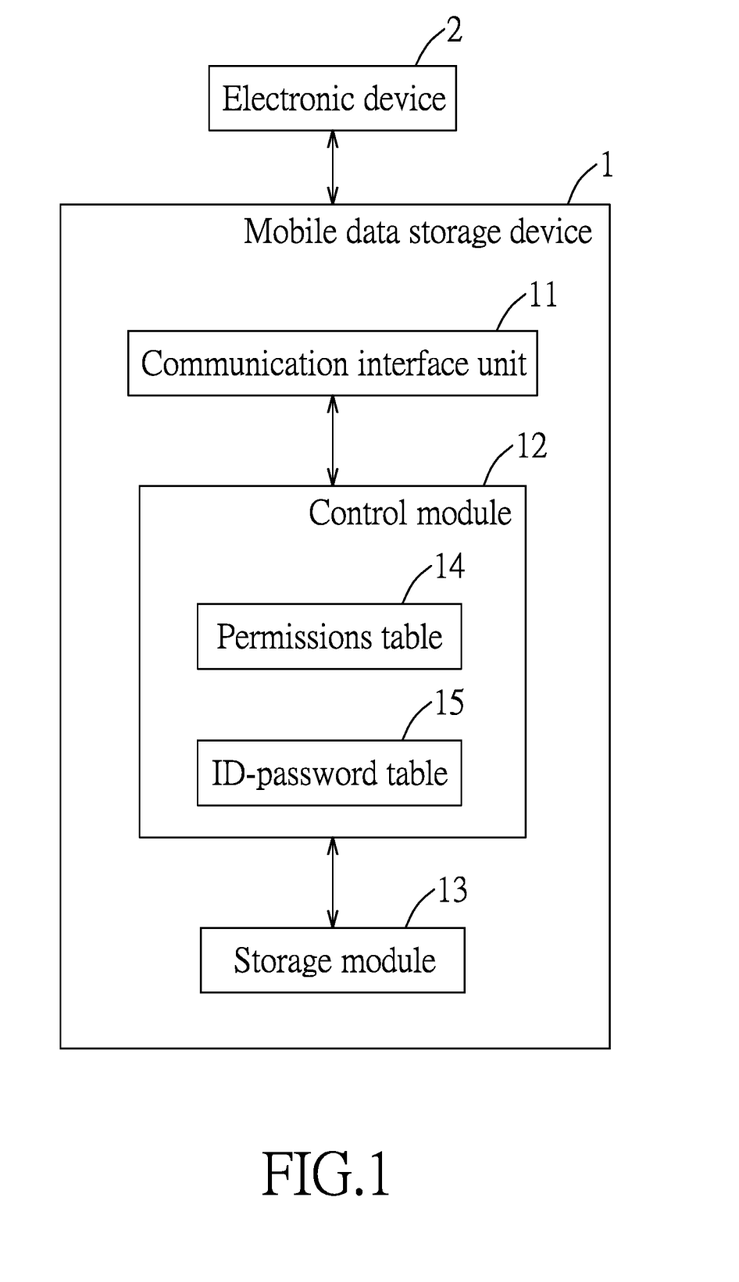
FIG. 1 is a block diagram illustrating an embodiment of a mobile data storage device with access control functionality according to the disclosure.

Referring to FIG. 1, an embodiment of a mobile data storage device 1 with access control functionality according to the disclosure is illustrated. The mobile data storage device 1 may be implemented to serve as a Universal Serial Bus (USB) flash drive and to be carried with ease, but is not limited thereto.

The mobile data storage device 1 is to be electrically connected to an electronic device 2. The mobile data storage device 1 includes a communication interface unit 11 for communication with the electronic device 2, a storage module 13, and a control module 12 electrically connected to the communication interface unit 11 and the storage module 13. The electronic device 2 may be implemented by a smartphone, a tablet, a notebook computer, or a personal computer, but is not limited thereto. In this embodiment, the communication interface unit 11 includes a physical connector, which may be implemented by one of a USB connector plug, a mini USB connector plug, a micro USB connector plug, and combinations thereof, but is not limited thereto. The physical connector may be implemented to comply with any standard available for connecting a peripheral electronic device or a portable electronic device to a major/host electronic device.

Figure 2:
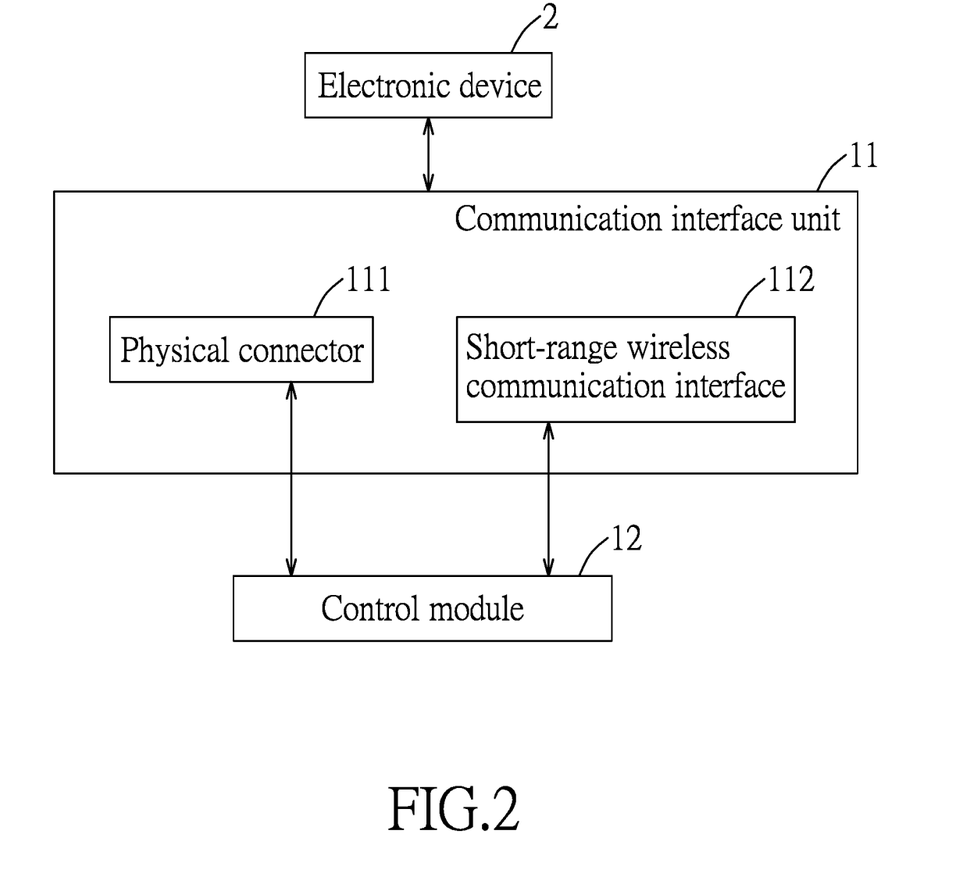
FIG. 2 is a block diagram illustrating an embodiment of a communication interface unit of the mobile data storage device according to the disclosure.

Referring to FIG. 2, in some embodiments, the communication interface unit 11 may include a physical connector 111, which may be a wire connector, and a short-range wireless communication interface 112, such as a Near Field Communication (NFC) interface. Also, the electronic device 2 is provided with short-range wireless communication capability. The control module 12 is configured to, when the electronic device 2 is electrically connected to the physical connector 111, communicate with the electronic device 2 via the physical connector 111, and is further configured to, when the electronic device 2 is not physically connected to the physical connector 111, communicate with the electronic device 2 via the short-range wireless communication interface 112 (i.e., the NFC interface) by bringing the mobile data storage device 1 and the electronic device 2 into proximity to each other.

Figure 3:
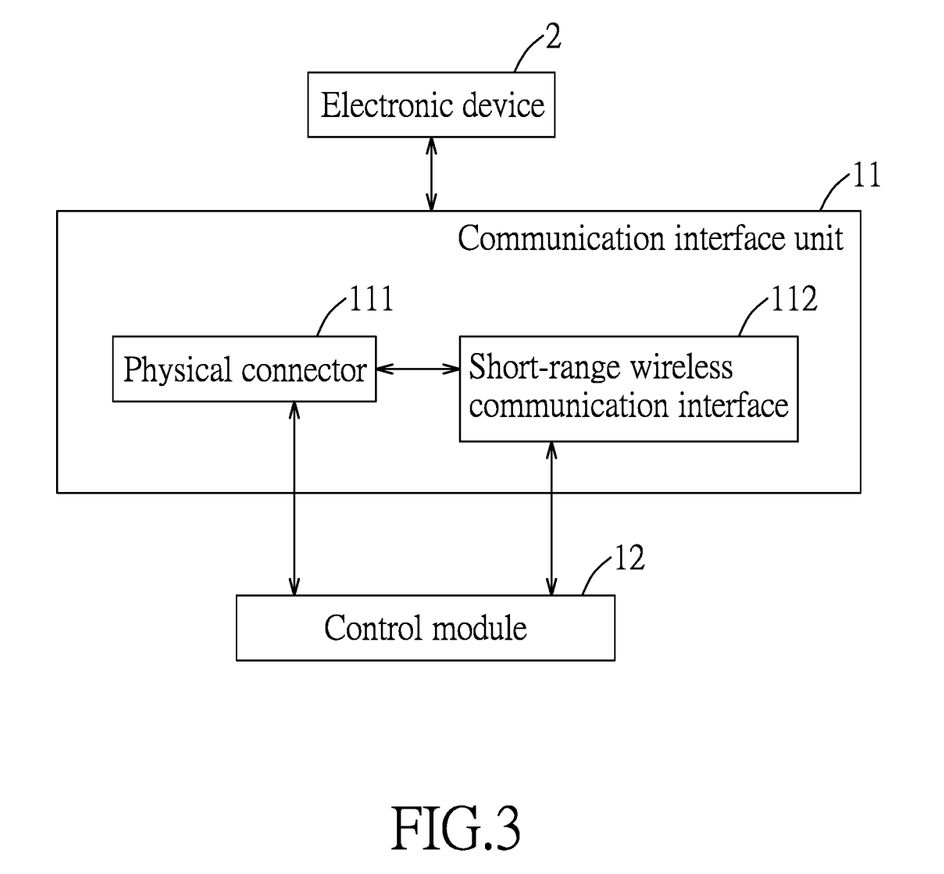
FIG. 3 is a block diagram illustrating another embodiment of the communication interface unit of the mobile data storage device according to the disclosure.

Similarly, in some embodiments, as shown in FIG. 3, the communication interface unit 11 may include a physical connector 111 and a short-range wireless communication interface 112 (e.g., the NFC interface) electrically connected to the physical connector 111, and be configured to, when the electronic device 2 is electrically connected to the physical connector 111, enable the electronic device 2 to transmit and/or receive a wireless signal via the short-range wireless communication interface 112 (i.e., the NFC interface) to and/or from another electronic device (not shown), in a case that the electronic device 2 is not provided with short-range wireless communication capability. In other words, the mobile data storage device 1 may be implemented to include a function of an NFC dongle.

Referring to FIG. 1 again, the control module 12 stores a permissions table 14, an ID-password table 15, and a signing program associated with a signing algorithm. The permissions table 14 is configured to record a reference user identification (ID) (or more than one reference user ID), and a user authority (or more than one user authority) that corresponds to the reference user ID and that specifies what operation is allowed on the storage module 13. The ID-password table 15 is configured to record the reference user ID and a reference user password (or more than one reference user password) that corresponds to the reference user ID. To access the storage module 13, when the mobile data storage device 1 is electrically connected to the electronic device 2 via the communication interface unit 11, the electronic device 2 executes an application program to transmit credential information which includes an asserted program ID and an asserted program password. The control module 12 is configured to store a reference program ID (or more than one reference program ID) and a reference program password (or more than one reference program password) that are associated with the application program. The control module 12 is configured to obtain the credential information via the communication interface unit 11 from the electronic device 2, to verify that the application program is authentic when the asserted program ID and the asserted program password included in the credential information conform respectively to the reference program ID and the reference program password, and to allow the electronic device 2, which is executing the application program, to establish a data connection with the control module after the control module 12 verifies that the credential information is authentic. The control module 12 is further configured to receive an asserted user ID and an asserted user password that are transmitted by the electronic device 2, to look up the user authority in the permissions table 14 based on the asserted user ID, and to enable the electronic device 2 to perform the operation allowed on the storage module 13 based on the user authority when it is determined by the control module 12 that the asserted user ID and the asserted user password conform respectively to the reference user ID and the reference user password in the ID-password table 15. As a result, authentication and authorization of a user may be realized so that the access to the storage module 13 is securely controlled.

In some embodiments, the data connection between the electronic device 2 and the control module 12 is utilized for transmitting the asserted user ID and the asserted user password, but is not limited thereto. In some embodiments, the data connection between the electronic device 2 and the control module 12 is utilized by the electronic device 2 to access the storage module 13 via the control module 12.

Figure 4:
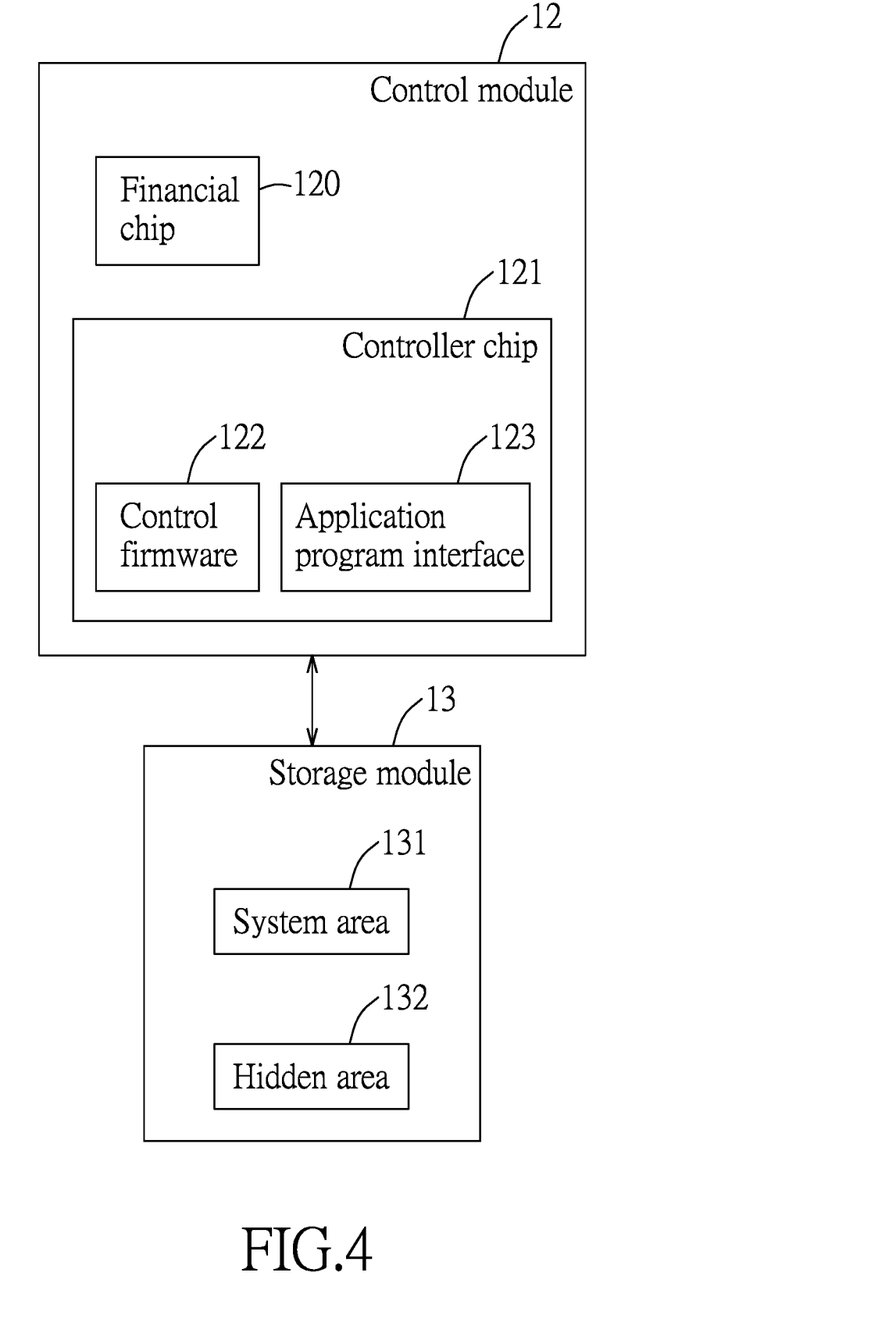
FIG. 4 is a block diagram illustrating an exemplary configuration of a control module and a storage module of the mobile data storage device according to the disclosure.

Specifically speaking, referring to FIG. 4, the control module 12 of this disclosure includes a controller chip 121 which stores a control firmware 122 and an application program interface (API) 123. The permissions table 14 and the ID-password table 15 (see FIG. 1) are stored in the control firmware 122. As shown in Table 1 below, an exemplary ID-password table stores multiple reference user IDs (i.e., ID1, ID2 and ID3) and corresponding reference user passwords (i.e., CODE1, CODE2 and CODE3) for verifying identity of a user who intends to use the mobile data storage device 1 to perform operations which require access to the storage module 13. It is worth noting that the at least one reference user password stored in the ID-password table 15 is encrypted so as to prevent password theft. Moreover, the control module 12 is configured to further store in the ID-password table 15 at least one reference program ID and at least one reference program password that are associated with the application program for verification as to whether the application program is authentic.

TABLE 1

Exemplary ID-password Table

| ID1 | CODE1 |
|-----|-------|
| ID2 | CODE2 |
| ID3 | CODE3 |

Referring to FIG. 4, the storage module 13 includes a system area 131 and a hidden area 132. The system area 131 has built-in basic operation information. The hidden area 132 is generally not allowed to be accessed by the electronic device 2. That is to say, the electronic device 2 is generally prohibited from reading, writing or editing data stored in the hidden area 132. Only when certain authentication and authorization procedures by the control module 12 have been completed successfully can the electronic device 2 execute the control firmware 122 stored in the controller chip 121 to access the hidden area 132 of the storage module 13. As a result, when the electronic device 2 is electronically connected to the mobile data storage device 1, data stored in the hidden area 132 is unavailable for users until the authentication and authorization procedures performed by the mobile data storage device 1 have been completed successfully. In this embodiment, the storage module 13 is a data storage, and may be implemented by at least one of a flash memory, a hard disk drive (HDD) or a solid state disk (SSD), but is not limited thereto.

Referring to Table 2 below, an exemplary permissions table stores the reference user IDs (i.e., ID1, ID2 and ID3) and corresponding user authorities. For example, the reference user ID ID1 corresponds to permissions to read and write data stored in the hidden area 132; the reference user ID ID2 corresponds to a permission to read data stored in the hidden area 132; the reference user ID ID3 corresponds to permissions to read, write and delete data stored in the hidden area 132. Therefore, the at least one user authority can be referred to so as to determine which operation (e.g., read, write and/or delete) on the data stored in the hidden area 132 is permissible for a specific user.

TABLE 2

Exemplary Permissions Table

| ID1 | Read/Write |
| ID2 | Read |
| ID3 | Read/Write/Delete |

Specifically speaking, the hidden area 132 is configured to store a secret key corresponding to a virtual account to be used for mobile payment. Before making a mobile payment, the electronic device 2 executes the application program, which is adapted for mobile payment, and provides prompt information to request input of the asserted user ID and the asserted user password. It should be noted that in some embodiments, the application program for mobile payment may utilize the asserted user ID and the asserted user password that are recorded in advance instead of requesting input of the same via the electronic device 2. Thereafter, the electronic device 2 executing the application program is configured to transmit to the control module 12 the credential information, which includes the asserted program ID and the asserted program password, as well as the asserted user ID, the asserted user password, and data to be signed (i.e., to be subjected to the signing algorithm) that is associated with mobile payment.

The control module 12, after receiving the credential information, is configured to call the API 123 to determine whether the application program is authentic based on the ID-password table 15, the asserted program ID and the asserted program password, and to verify that the application program is authentic when the asserted program ID and the asserted program password conform respectively to the reference program ID and the reference program password stored in the ID-password table 15. Also, when it is verified by the control module 12 that the application program is authentic, the control module 12 allows the API 123 to be called to create the data connection between the electronic device 2 and the control module 12.

Additionally, after receiving the asserted user ID and the asserted user password, the control module 12 is configured to perform the authorization procedure by calling the API 123 to look up, in the permissions table 14, the user authority (e.g., the permission to read data stored in the hidden area 132 which corresponds to the reference user ID ID2 as shown in Table 2) based on the asserted user ID, and to perform the authentication procedure to determine whether the asserted user ID and the asserted user password conform respectively to the reference user ID and the reference user password in the ID-password table 15. When it is determined by the control module 12 that the user authority thus looked up allows access to the hidden area 132 and that the asserted user ID and the asserted user password conform respectively to the reference user ID and the reference user password in the ID-password table 15, the control module 12, after obtaining the data to be signed from the electronic device 2, is configured to obtain the secret key stored in the hidden area 132 by executing the control firmware 122, to execute the signing program to generate a message authentication code (MAC) based on the data to be signed using the secret key, and to transmit the MAC via the communication interface unit 11 to the electronic device 2 for further processing.

Moreover, in a variation of this embodiment as shown in FIG. 4, the control module 12 further includes a financial chip 120 that stores the signing program and the secret key which is provided by a financial institution issuing the financial chip 120. Similarly, to make a mobile payment, the previously mentioned authentication and authorization procedures are performed. When it is determined that the user authority thus looked up allows access to the financial chip 120 and that the asserted user ID and the asserted user password conform respectively to the reference user ID and the reference user password in the ID-password table 15, the control module 12, after obtaining the data to be signed from the electronic device 2, is configured by executing the control firmware 122 in such a way that the financial chip 120 is provided with the data to be signed and executes the signing program to generate the MAC based on the data to be signed using the secret key. The control module 12 then transmits the MAC via the communication interface unit 11 to the electronic device 2 for further processing. Details of the financial chip 120 for mobile payment of this embodiment are, for example, disclosed in U.S. Pat. No. 9,659,291B2.

It should be noted that the previously mentioned authentication and authorization procedures are performed for mobile payment regardless of whether or not the control module 12 is implemented to include the financial chip 120.

In one case that the secret key to be used for implementing mobile payment by the mobile data storage device 1 is stored in the hidden area 132, when the previously mentioned authentication and authorization procedures have been completed successfully, the control module 12 which has obtained, from the electronic device 2, data to be signed via the communication interface unit 11 is configured by executing the control firmware 122 to obtain the secret key stored in the hidden area 132, to execute the signing program stored in the controller chip 121 to generate the MAC based on the data to be signed using the secret key, and to transmit the MAC to the electronic device 2 via the communication interface unit 11. Details of the above-mentioned case of mobile payment may be appreciated by referring to U.S. Patent Application Publication No. US2014/0289121 A1.

In another case that the control module 12 includes the financial chip 120 which stores the signing program and that the secret key (provided by a financial institution other than that issuing the financial chip 120) to be used for implementing mobile payment by the mobile data storage device 1 is stored in the hidden area 132, when the previously mentioned authentication and authorization procedures have been completed successfully, the control module 12 which has obtained data to be signed from the electronic device 2 via the communication interface unit 11 is configured by executing the control firmware 122 to obtain the secret key stored in the hidden area 132, and is configured in such a way that the financial chip 120 is provided with the secret key and the data to be signed, and the financial chip 120 executes the signing program to generate the MAC based on the data to be signed using the secret key. The control module 12 then transmits the MAC to the electronic device 2 via the communication interface unit 11.

In still another case that the control module 12 includes the financial chip 120 which stores the signing program and the secret key to be used for implementing mobile payment by the mobile data storage device 1, when the previously mentioned authentication and authorization procedures have been completed successfully, the control module 12, after obtaining the data to be signed from the electronic device 2 via the communication interface unit 11, is configured by executing the control firmware 122 in such a way that the financial chip 120 is provided with the data to be signed, and the financial chip 120 executes the signing program to generate the MAC based on the data to be signed using the secret key. The control module 12 then transmits the MAC to the electronic device 2 via the communication interface unit 11.

Consequently, the financial chip 120 may be implemented to be included in or omitted from the control module 12 depending on practical needs.

Furthermore, the mobile data storage device 1 of this disclosure realizes at least four functions of identity verification, access control, private resource management and personal information protection.

In the aspect of the function of personal identification, the hidden area 132 of the storage module 13 can be utilized to store user identity data that is associated with a user's identity. When the electronic device 2 executing the application program provides the control module 12 with the asserted user ID and the asserted user password, which may be inputted via the electronic device 2 or obtained from a record saving the previously inputted asserted user ID and the asserted user password, and tries to access the user identity data, the API 123 is called by the control module 12 to determine whether the application program is authentic. When the application program is verified to be authentic and the control module 12 obtains the asserted user ID and the asserted user password, the control module 12 looks up the user authority in the permissions table 14 based on the asserted user ID, and determines whether the asserted user ID and the asserted user password conform respectively to the reference user ID and the reference user password in the ID-password table 15. The control module 12 is configured to enable the electronic device 2 to access the hidden area 132 of the storage module 13 and to obtain the user identity data stored therein by executing the control firmware 122 when it is determined by the control module 12 that the user authority thus looked up allows access to the hidden area 132 and that the asserted user ID and the asserted user password conform respectively to the reference user ID and the reference user password in the ID-password table 15. The user identity data thus obtained can be utilized for further application associated with personal identification.

In the aspect of the function of access control, the ID-password table 15 and the permissions table 14 can be stored in advance in the control firmware 122 by executing the API 123 before the mobile data storage device 1 is released for use by users. The ID-password table 15 is configured to record the reference user IDs, each of which is associated with a user of the mobile data storage device 1, and the reference user passwords, each of which corresponds to a respective one of the reference user IDs. The permissions table 14 is configured to record the reference user IDs and the user authorities, each of which corresponds to a respective one of the reference user IDs and specifies the operations (e.g., read, update, delete, etc.) allowed on the hidden area 132 of the storage module 13. Therefore, an effect that different users have different user authorities is realized.

In addition to data connection establishment and access control management, the API 123 can be called to personalize configurations of the control module 12. The function of personalization is called "Perso" herein. Specifically speaking, after the application program is verified as authentic and the data connection is established by calling the API 123, the control module enables the electronic device 2 to update the permissions table 14 and/or the ID-password table 15 when it is determined by the control module 12 that the user authority thus looked up allows updating the permissions table 14 and/or the ID-password table 15 (i.e., the authorization procedure is successful) and that the asserted user ID and the asserted user password conform respectively to the reference user ID and the reference user password in the ID-password table 15 (i.e., the authentication procedure is successful).

In the aspect of the function of private resource management, the control module 12 is con figured to enable the electronic device 2 to establish, through the control module 12, a plurality of private spaces in the hidden area 132 of the storage module 13 only when it is determined by the control module 12 that the user authority thus looked up allows arrangement of storage spaces of the hidden area 132 and that the asserted user ID and the asserted user password conform respectively to the reference user ID and the reference user password in the ID-password table 15. Specifically speaking, after the data connection between the application program currently executed by the electronic device 2 and the API 123 of the control module 12 is created, and after the authentication and authorization procedures have been completed successfully, the control module 12 enables the electronic device 2 executing the application program to issue commands to the control module 12, so as to establish the plurality of private spaces in the hidden area 132 via the control module 12 which calls the API 123 to perform the function of Perso, such that different types of private data (e.g., mobile payment related information, personal health record, various kinds of certificates, and so on) can be stored in the plurality of private spaces, respectively. Furthermore, the control module 12 is configured to assign, in the permissions table 14, the user authorities for accessing the private spaces respectively to the reference user IDs.

In the aspect of the function of personal information protection, the API 123 of the control module 12 includes functions of encryption and decryption, which may be implemented by at least one of Triple Data Encryption Algorithm (3DES), Advanced Encryption Standard (AES) or RSA algorithm, so as to encrypt or decrypt data.

For example, after the data connection has been established between the application program currently being executed by the electronic device 2 and the API 123 of the control module 12, and after the authentication and authorization procedures have been completed successfully (i.e., the user authority thus looked up allows access to at least one of the plurality of private spaces), the control module 12 is configured to enable the electronic device 2 to access said at least one of the plurality of private spaces, such that the control module 12 is capable of calling the API 123 to encrypt data, which may be related to personal information, obtained from the electronic device 2, and calling the control firmware 122 to store the data thus encrypted in the at least one of the plurality of private spaces, and is further capable of calling the API 123 to decrypt data obtained from the at least one of the plurality of private spaces and calling the control firmware 122 to transmit the data thus decrypted to the electronic device 2.

Figure 5:
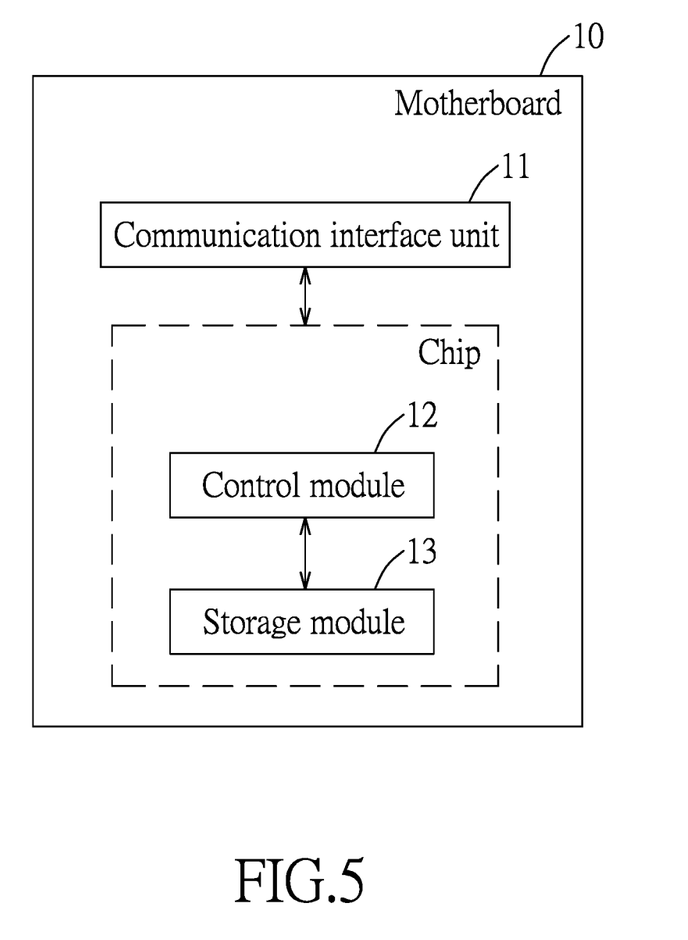
FIG. 5 is a block diagram illustrating one embodiment of the mobile data storage device, wherein the control module and the storage module thereof are integrated into an access control chip mounted on a motherboard.

Referring to FIG. 5, in some embodiments, the mobile data storage device 1 (see FIG. 1) further includes a motherboard 10. The communication interface unit 11 is mounted on the motherboard 10. The storage module 13 and the control module 12 are implemented to be integrated in an access control chip that is mounted on the motherboard 10 and that is electrically connected to the communication interface unit 11.

Figure 6:
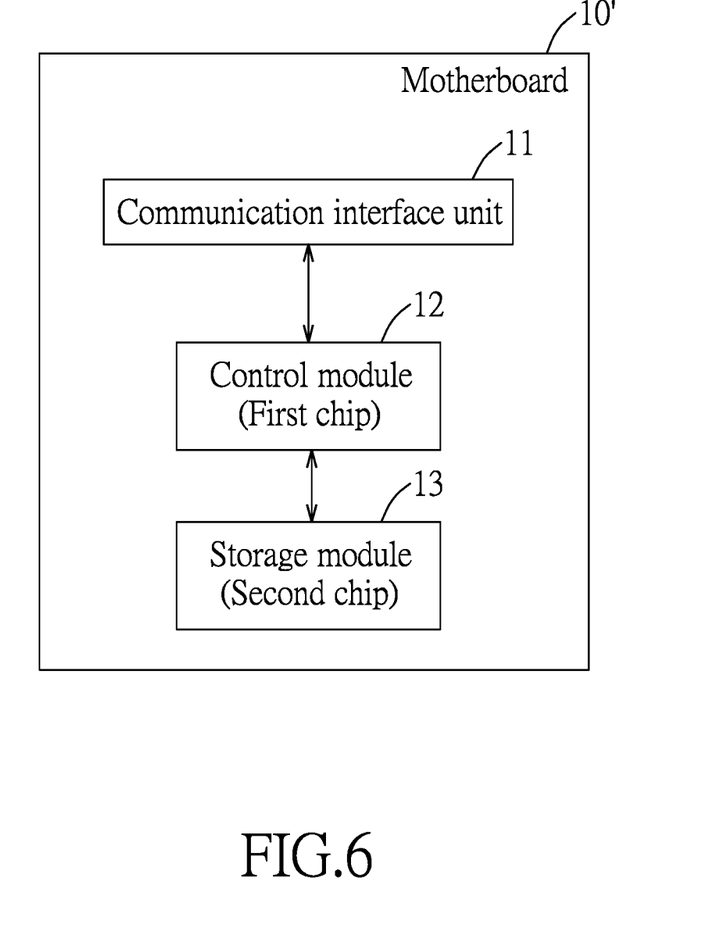
FIG. 6 is a block diagram illustrating another embodiment of the mobile data storage device, wherein the control module and the storage module thereof are respectively implemented as separated first and second chips mounted on a motherboard.

Referring to FIG. 6, in some embodiments, the mobile data storage device 1 (see FIG. 1) further includes the motherboard 10'. The communication unit 11 is mounted on the motherboard 10'. The control module 12 is implemented by a first chip mounted on the motherboard 10'. The storage module 13 is implemented by a second chip mounted on the motherboard 10' and is separately disposed with respect to the control module 12.

It should be noted that the chips mentioned above may be implemented by integrated circuits (ICs) designed and fabricated to carry out corresponding functionalities.

In summary, in the mobile data storage device 1 of this disclosure, access by the electronic device 2 to the storage module 13, especially to the hidden area 132 thereof, is controlled via the built-in control module 12. In addition, the control module 12 may be implemented by a single chip (i.e., the access control chip) mounted on the motherboard 10 or by two separate chips (i.e., the first and second chips) mounted separately on the motherboard 10 with respect to each other.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mobile data storage device with access control functionality, the mobile data storage device to be electrically connected to an electronic device, and comprising:
    a communication interface unit;
    a storage module including a hidden area that is configured to store a secret key; and
    a control module electrically connected to said communication interface unit and said storage module, and storing
        a permissions table configured to record a reference user identification (ID), and a user authority that corresponds to the reference user ID and that specifies what operation is allowed on said storage module, and
        an ID-password table configured to record the reference user ID and a reference user password that corresponds to the reference user ID;
    wherein said control module is configured to obtain credential information via said communication interface unit from the electronic device, and to, after said control module verifies that the credential information is authentic, allow the electronic device to establish a data connection with said communication interface unit, said control module being further configured to receive an asserted user ID and an asserted user password that are transmitted by the electronic device, to look up the user authority in the permissions table based on the asserted user ID, and to enable, when it is determined by said control module that the asserted user ID and the asserted user password conform respectively to the reference user ID and the reference user password in the ID-password table, the electronic device to perform the operation allowed on said storage module based on the user authority;
    wherein said control module is configured to enable the electronic device to access said hidden area of said storage module when it is determined by said control module that the user authority thus looked up allows access to said hidden area and that the asserted user ID and the asserted user password conform respectively to the reference user ID and the reference user password in the ID-password table; and
    wherein said control module stores a signing program, obtains data to be signed via said communication interface unit from the electronic device, and is configured to, when it is determined by said control module that the user authority thus looked up allows access to said hidden area and that the asserted user ID and the asserted user password conform respectively to the reference user ID and the reference user password in the ID-password table, obtain the secret key stored in said hidden area, execute the signing program to generate a message authentication code (MAC) based on the data to be signed using the secret key, and transmit the MAC to the electronic device.

2. The mobile data storage device as claimed in claim 1, the electronic device executing an application program to transmit the credential information which includes an asserted program ID and an asserted program password, wherein:
    said control module is configured to store a reference program ID and a reference program password that are associated with the application program, and to verify that the application program is authentic when the asserted program ID and the asserted program password included in the credential information conform respectively to the reference program ID and the reference program password.

3. The mobile data storage device as claimed in claim 1, wherein said control module
    is configured to, when it is determined by said control module that the user authority thus looked up allows arrangement of storage spaces of said hidden area, enable the electronic device to establish, through said control module, a plurality of private spaces in said hidden area, and
    is further configured to enable, when it is determined by said control module that the user authority thus looked up allows access to at least one of said plurality of private spaces and that the asserted user ID and the asserted user password conform respectively to the reference user ID and the reference user password in the ID-password table, the electronic device to access said at least one of said plurality of private spaces, such that said control module is capable of encrypting data obtained from the electronic device and storing the data thus encrypted in said at least one of said plurality of private spaces, and is capable of decrypting data obtained from said at least one of said plurality of private spaces and transmitting the data thus decrypted to the electronic device.

4. The mobile data storage device as claimed in claim 1, wherein:
    said control module includes a financial chip that stores the signing program, and is configured to, when it is further determined that the user authority thus looked up allows access to said financial chip, obtain the secret key stored in said hidden area, such that said financial chip is provided with the secret key and the data to be signed and executes the signing program to generate the MAC based on the data to be signed using the secret key, said control module transmitting the MAC via said communication unit to the electronic device.

5. The mobile data storage device as claimed in claim 1, wherein said control module is configured to enable the electronic device to update the permissions table and/or the ID-password table when it is determined by said control module that the user authority thus looked up allows updating the permissions table and/or the ID-password table and that the asserted user ID and the asserted user password conform respectively to the reference user ID and the reference user password in the ID-password table.

6. The mobile data storage device as claimed in claim 1, wherein said communication interface unit includes a physical connector.

7. The mobile data storage device as claimed in claim 1, wherein:
said communication interface unit includes a physical connector and a short-range wireless communication interface electrically connected to said physical connector, and is configured to, when the electronic device is electrically connected to said physical connector, enable the electronic device to transmit and/or receive a wireless signal via said short-range wireless communication interface.

8. The mobile data storage device as claimed in claim 1, further comprising a motherboard, wherein:
said communication interface unit is mounted on said motherboard; and
said storage module and said control module are implemented to be integrated in an access control chip mounted on said motherboard.

9. The mobile data storage device as claimed in claim 1, further comprising a motherboard, wherein:
said communication unit is mounted on said motherboard; and
said control module is implemented by a first chip mounted on said motherboard; and
said storage module is implemented by a second chip mounted on said motherboard and is separately disposed with respect to said control module.

10. A mobile data storage device with access control functionality, the mobile data storage device to be electrically connected to an electronic device, and comprising:
a communication interface unit;
a storage module; and
a control module electrically connected to said communication interface unit and said storage module, and storing
a permissions table configured to record a reference user identification (ID), and a user authority that corresponds to the reference user ID and that specifies what operation is allowed on said storage module, and
an ID-password table configured to record the reference user ID and a reference user password that corresponds to the reference user ID;
wherein said control module is configured to obtain credential information via said communication interface unit from the electronic device, and to, after said control module verifies that the credential information is authentic, allow the electronic device to establish a data connection with said communication interface unit, said control module being further configured to receive an asserted user ID and an asserted user password that are transmitted by the electronic device, to look up the user authority in the permissions table based on the asserted user ID, and to enable, when it is determined by said control module that the asserted user ID and the asserted user password conform respectively to the reference user ID and the reference user password in the ID-password table, the electronic device to perform the operation allowed on said storage module based on the user authority; and
wherein said control module includes a financial chip that stores a secret key and a signing program, obtains data to be signed via said communication interface unit from the electronic device, and is configured in such a way that, when it is determined that the user authority thus looked up allows access to said financial chip and that the asserted user ID and the asserted user password conform respectively to the reference user ID and the reference user password in the ID-password table, said financial chip is provided with the data to be signed and executes the signing program to generate a message authentication code (MAC) based on the data to be signed using the secret key, said control module transmitting the MAC via said communication unit to the electronic device.

11. A mobile data storage device with access control functionality, the mobile data storage device to be electrically connected to an electronic device that is provided with short-range wireless communication capability, and comprising:
a communication interface unit;
a storage module; and
a control module electrically connected to said communication interface unit and said storage module, and storing
a permissions table configured to record a reference user identification (ID), and a user authority that corresponds to the reference user ID and that specifies what operation is allowed on said storage module, and
an ID-password table configured to record the reference user ID and a reference user password that corresponds to the reference user ID;
wherein said control module is configured to obtain credential information via said communication interface unit from the electronic device, and to, after said control module verifies that the credential information is authentic, allow the electronic device to establish a data connection with said communication interface unit, said control module being further configured to receive an asserted user ID and an asserted user password that are transmitted by the electronic device, to look up the user authority in the permissions table based on the asserted user ID, and to enable, when it is determined by said control module that the asserted user ID and the asserted user password conform respectively to the reference user ID and the reference user password in the ID-password table, the electronic device to perform the operation allowed on said storage module based on the user authority;
wherein said communication interface unit includes a physical connector and a short-range wireless communication interface; and
wherein said control module is configured to, when the electronic device is electrically connected to said physical connector, communicate with the electronic device via said physical connector, and is further configured to, when the electronic device is not electrically connected to said physical connector, communicate with the electronic device via said short-range wireless communication interface.

* * * * *